Patented Nov. 23, 1926.

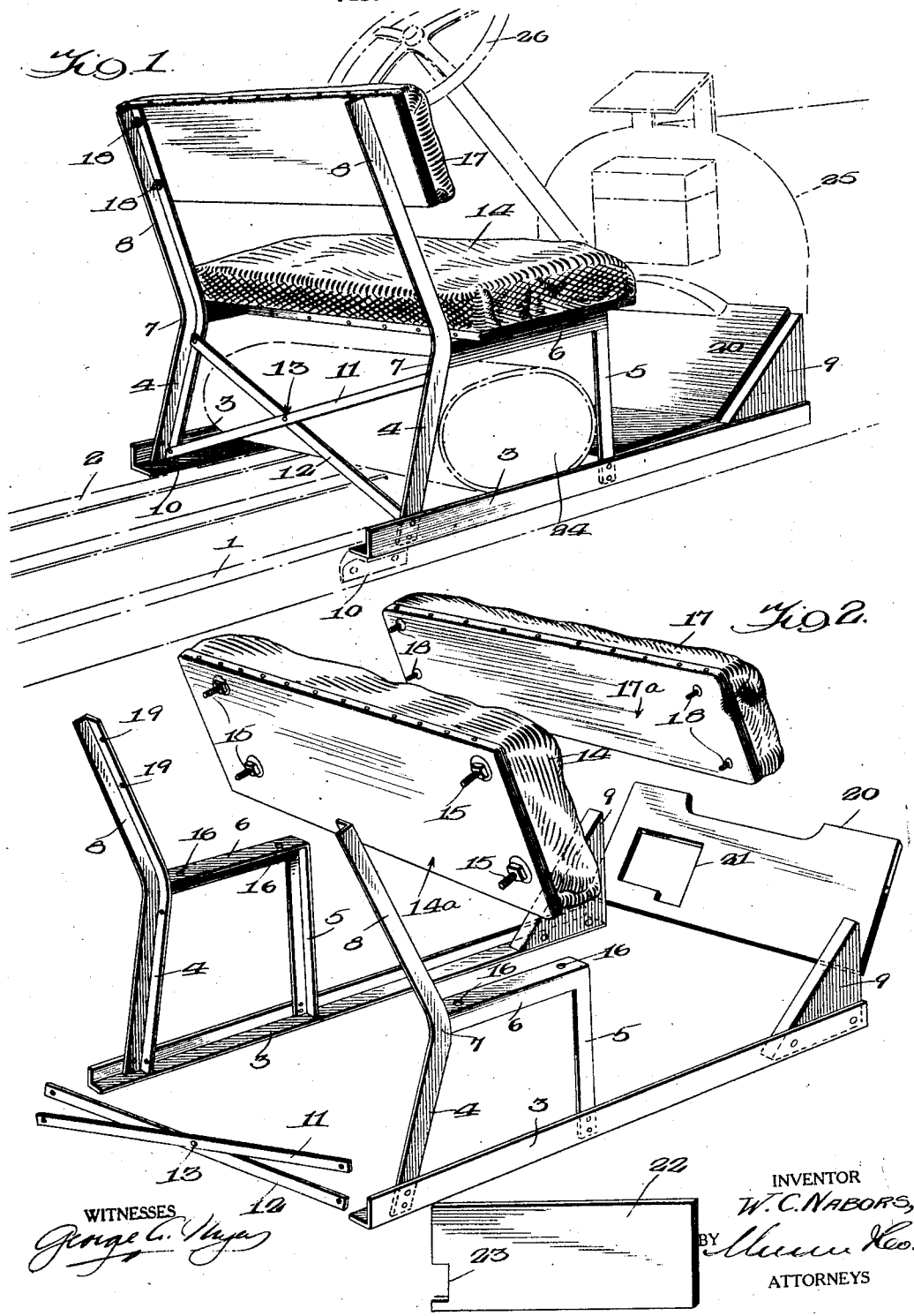

1,608,033

UNITED STATES PATENT OFFICE.

WILLIAM CAMPBELL NABORS, OF MANSFIELD, LOUISIANA.

SEAT FOR THE CHASSIS OF AUTOMOBILES OR TRUCKS.

Application filed June 3, 1924. Serial No. 717,603.

This invention relates to seats for the chassis of automobiles or trucks, and has for its object the provision of a device which may be readily assembled for application to the chassis of a dismantled vehicle as a seat and foot rest, and which may be disassembled for return shipment to the distributing station from which the dismantled automobile or truck was driven.

A further object of the invention is the provision of a device affording a complete seat and foot rest assembly for ready application to the dismantled chassis of an automobile or truck which is intended to be driven from a distributing center or factory, the device being simple and economical in construction, and having such knockdown characteristics that the same may be readily disassembled and formed into neat bundles for return shipment.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:—

Figure 1 is a view in perspective of the seat or foot rest assembly constructed according to the principles of my invention;

Figure 2 is a view in perspective of the seat and foot rest assembly with parts in detached relation, exemplifying the knockdown characteristics of the structure.

Referring more particularly to the drawing, 1 and 2 designate channel members of the frame of the chassis indicated by dash and dot lines, and upon which are adapted to be mounted base members 3 of angle iron construction and secured to the lower ends of legs 4 and 5 of the side members of the seat, these legs being set down on the horizontal flange of the angle iron base bars. Legs 5 have horizontal portions 6 extending rearwardly from their upper ends, while legs 4 are bent rearwardly as shown at 7 and have upper extensions 8 for a purpose which will be presently described. The legs 4 and 5 and the extension 8 are also formed of angle iron construction, the legs setting in the angle of the base angle irons 3.

The base members 3 extend forwardly of the legs 5 and have secured to their forward ends triangularly shaped blocks 9. The angle irons 3 are to be secured to the usual brackets 10, forming part of the construction of the channel beams 1 and 2 and the usual bolts for securing the body of the assembly to the brackets 10 are employed for locking the base members 3 to said brackets. The legs 4 are secured in rigid relation and braced by the bars 11 and 12 pivoted at 13 intermediate their ends. The ends of said bars are secured to one of the flanges of the angle iron which form the rear legs of the seat.

A seat 14 which may be padded or sufficiently cushioned for comfort of the driver has a rigid base plate 14$^a$ to which are secured in any approved manner, the threaded studs 15. These studs project downwardly, and are adapted to be received within the perforations 16 of the horizontal member 6 of the seat frame. Nuts are drawn up tight on the threaded studs 15 for locking the seat in position. A rest 17 for the back likewise has a padded or cushion portion adapted to engage the back of the driver, and has a rigid back plate 17$^a$ provided with outwardly projected threaded lugs 18. These lugs are passed through perforations 19 in the upper members 8 of the legs 4 and are drawn up tight against the extension 8 by means of the usual nuts.

A foot rest 20 of similar construction to one of the floor boards of an automobile is placed in an inclined position at the rear of the cowl 25 and has an opening 21 through which are adapted to project the usual operating pedals for controlling the automobile. A floor board 22 is adapted to be mounted on blocks and removably supported on the base bars 3 fitting within the angles thereof, and upon which the feet of the driver rest when otherwise not employed in operating the usual foot pedal. This board has a notch 23 at one end through which is adapted to project the usual emergency brake lever.

The complete set-up assembly is so positioned on the channel members 1 and 2 that by their connection with the usual brackets 10 that the same will be in convenient position for the driver to operate the usual foot pedal and control the steering wheel 26. Furthermore, the gasoline tank 24 will be located below the seat 14 and be protected thereby.

It will be seen that a foot rest and seat assembly may be readily set up and knocked down when desired, it being only necessary to remove the nuts from the threaded studs 15 and 18 so that the seat 14 and back support 17 may be readily removed. The connecting means between the opposite ends of the bars 11 and 12 and the legs 4 may be readily removed so that when the floor boards 20 and 22 are lifted from their position at the front of the seat the whole may be tied into a neat unitary structure and forwarded to the original place from which the truck had been driven.

I claim:—

A knockdown seat and foot rest assembly for automotive vehicles comprising pairs of spaced apart side legs, the front legs of each pair having horizontal extensions connected to the rear legs and forming seat supports, the rear legs having upstanding extensions forming back rest supports, angle iron base bars connected to the lower ends of the rear and front legs and extending forwardly of the front legs, the said legs disposed within the angle of the base bars, removable and diagonally disposed brace rods, detachably connecting the rear legs, a seat assembly removably connected with the horizontal extensions of the front legs, a back rest assembly removably connected with the upstanding back rest supports, inclined-face blocks mounted at the forward ends of the base bars, and within the angle thereof, a foot board mounted on the inclined faces of said blocks, and a second foot board horizontally supported within and by the angle bars, said second foot-board disposed between the inclined foot rest and the front legs of the seat, the complete set-up assembly adapted to be removably secured and supported on the conventional chassis side brackets.

WILLIAM CAMPBELL NABORS.